(No Model.)
G. H. PALMS.
SPRING BUMPER FOR SAWING MACHINES.
No. 562,093. Patented June 16, 1896.
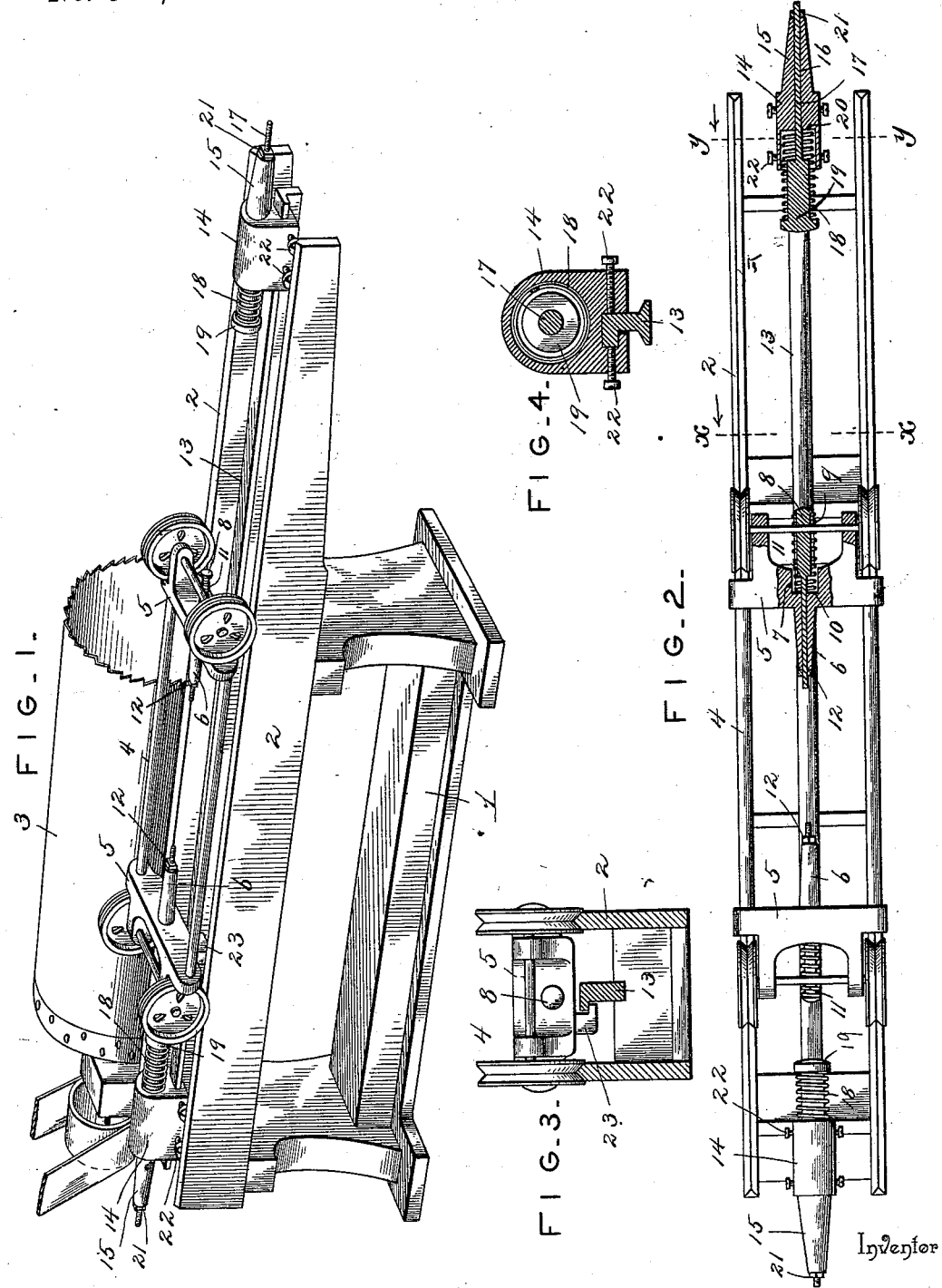
Witnesses
Harry L. Amer.
V. B. Hillyard.
Inventor
George H. Palms.
By his Attorneys,
C. A. Snow & Co.

UNITED STATES PATENT OFFICE.

GEORGE H. PALMS, OF GREENWOOD, WISCONSIN.

SPRING-BUMPER FOR SAWING-MACHINES.

SPECIFICATION forming part of Letters Patent No. 562,093, dated June 16, 1896.

Application filed November 14, 1895. Serial No. 568,967. (No model.)

*To all whom it may concern:*

Be it known that I, GEORGE H. PALMS, a citizen of the United States, residing at Greenwood, in the county of Clark and State of Wisconsin, have invented a new and useful Spring-Bumper for Sawing-Machines, of which the following is a specification.

This invention relates to woodworking machinery, and most especially to that class employing a cylindrical saw and used for sawing staves and similar blanks or articles having a curved surface and forming the elementary parts of barrels, tubs, buckets, and kindred articles.

The objects aimed at are to stop the carriage with the least possible amount of jar upon the machine, to insure a speedy return of the carriage and thereby increase the capacity of the machine, to relieve the strain upon the attendant, and to reduce the amount of labor in operating the saw to a minimum.

To attain these and other objects, which will appear as the nature of the invention is understood, the mechanism substantially as shown in the accompanying drawings has been devised, although in adapting the same to different machines it will be understood that various changes in the form, proportion, and the minor details of construction may be resorted to without departing from the principle or sacrificing any of the advantages of this invention.

In the drawings, Figure 1 is a perspective view of a stave-sawing machine of well-known construction having the invention applied thereto, the carriage being divested of the work-holding provisions. Fig. 2 is a top plan view of the carriage and its bed, parts being broken away, showing the detailed construction of the spring-bumpers at one end of the carriage and bed. Fig. 3 is a cross-section on the line X X of Fig. 2. Fig. 4 is a detail section on the line Y Y of Fig. 2.

The same reference-numerals denote corresponding and like parts in all the figures of the drawings, and in the latter 1 indicates the base, 2 the bed, 3 the cylinder-saw, and 4 the carriage, forming the essential parts of a stave-sawing machine of well-known construction. The castings or end pieces 5 of the carriage are supplied with inwardly-extending barrels 6, whose bores aline with openings 7, formed in the end pieces 5, and in which operate rods or bars 8. A coil-spring 9 is mounted upon the outer end portion of each rod or bar 8 and is confined between a shoulder or stop 10 at the inner end of the opening 7 and a corresponding stop 11 at the outer end of the rod or bar 8. The inner end of the rods or bars 8 is threaded and a tension-nut 12 is mounted thereon and capable of operation in the usual way to regulate the tension of the coil-springs 9.

The spring-bumpers at the ends of the bed are similarly formed and are adjustable along the middle rail 13 to adapt their position to the length of the work and the movement of the carriage. Each of these spring-bumpers is composed of a head 14, having a tubular extension 15 and having an enlarged bore 16 in line with the bore of the tubular extension 15, a bar or rod 17 operating through the head and tubular extension, and a coil-spring 18, mounted upon the enlarged portion of the bar or rod 17 and confined between the head 19 thereof and a shoulder 20 at the base of the bore 16. The outer end of the bar or rod 17 is threaded and a tension-nut 21 is mounted thereon to regulate the tension of the spring 18. The several rods or bars 8 and 17 are in alinement and are disposed so that the rods or bars 8 and 17 will come squarely together when the carriage reaches the limit of its movement in either direction. The heads 14 are grooved in their lower sides to receive the upper portion of the middle rail 13, and binding-screws 22 pass laterally through the sides and have their inner ends engaging with the said rail 13 to hold the heads 14 in the adjusted position. It will be understood that the carriage will be supplied with the usual work-holding devices, which are omitted in the present instance because they form no part of the invention. The carriage is held upon the bed by depending hooks 23, which engage with the head of the middle rail 13. The carriage is moved upon its bed in the usual manner, and when reaching the limit of its travel in one direction the spring-bumpers strike and gently check the movement of the carriage and start the latter on its return travel, thereby preventing jar and strain to the machine and the attendant. When the carriage reaches the limit of its return movement, the spring-bumpers will come together with a result similar to that just described.

It has been demonstrated by practical experiment that a machine equipped with the invention has its capacity materially increased, and its usefulness is prolonged inasmuch as it is not subjected to such great wear and tear as when rigid and unyielding bumpers are employed, and the strain and labor upon the attendant are materially diminished, thereby facilitating his work and rendering it less arduous.

Having thus described the invention, what is claimed as new is—

1. In woodworking machinery, the combination with a bed, and a spring-bumper at each end of the bed, of a reciprocating carriage mounted and adapted to travel upon the bed, and a spring-bumper at each end of the carriage to alternately engage with the corresponding spring-bumpers at the ends of the bed to check the carriage in its movement in one direction and materially assist it upon its return stroke, substantially as set forth.

2. The combination with a carriage having metal end pieces provided with openings, barrels attached to the end pieces in line with the openings formed therein, rods or bars operating through the openings and barrels, and springs mounted upon an end portion of the said rods or bars and confined between suitable stops, substantially as and for the purpose set forth.

3. The combination with a bed having a rail, of a head adjustably mounted upon the rail and having a bore and a tubular extension in line with the bore, a rod or bar operating through the bore of the head and its tubular extension, and a coil-spring mounted upon the said rod or bar and confined between suitable stops provided on the said bar or rod and the head, substantially as set forth.

In testimony that I claim the foregoing as my own I have hereto affixed my signature in the presence of two witnesses.

GEORGE H. PALMS.

Witnesses:
A. A. HARTSON,
OLGA ROSSMAN.